United States Patent
Imai et al.

[11] Patent Number: 6,107,621
[45] Date of Patent: Aug. 22, 2000

[54] MODULAR ENCODER AND METHOD OF MANUFACTURING THE SAME

[75] Inventors: Motokatsu Imai, Yokohama; Kou Ohno, Sagamihara; Yasuhiko Hashimoto, Kobe; Shigeki Yamauchi, Kakogawa, all of Japan

[73] Assignee: Kawasaki Jukogyo Kabushiki Kaisha, Japan

[21] Appl. No.: 09/077,115

[22] PCT Filed: Mar. 6, 1997

[86] PCT No.: PCT/JP97/00736

§ 371 Date: Jul. 29, 1999

§ 102(e) Date: Jul. 29, 1999

[87] PCT Pub. No.: WO97/33142

PCT Pub. Date: Sep. 12, 1997

[30] Foreign Application Priority Data

Mar. 8, 1996 [JP] Japan ..................................... 8-051652

[51] Int. Cl.[7] ....................................................... G01D 5/34
[52] U.S. Cl. ......................................... 250/231.13; 341/31
[58] Field of Search .......................... 250/231.13–231.18; 341/13, 31; 356/375

[56] References Cited

U.S. PATENT DOCUMENTS

| | | | |
|---|---|---|---|
| 4,184,071 | 1/1980 | Fryer et al. | 250/231.13 |
| 4,285,595 | 8/1981 | Fryer et al. | 356/243 |
| 4,475,034 | 10/1984 | Maddox et al. | 250/231.13 |
| 5,057,684 | 10/1991 | Service | 250/231.13 |
| 5,708,496 | 7/1998 | Barnett et al. | 250/231.13 |

*Primary Examiner*—Stephone B. Allen
*Attorney, Agent, or Firm*—Oppenheimer Wolff & Donnelly LLP

[57] ABSTRACT

Each component of a modular encoder can be formed so as to be fixed to a rotary shaft of a rotating unit in a horizontal direction (a direction of a shaft line of a rotary shaft). Consequently, the modular encoder can easily be assembled and fixed, and reliability of fixation can be enhanced at the same time. In addition, the modular encoder has an elliptical shape so that a size thereof can be reduced in a direction in which a dimension should be decreased. Furthermore, if the holding member is rotatably fitted in the locking member in such a manner that the holding member can be rotated around the rotary shaft of the rotating unit, a sign plate can easily be aligned.

4 Claims, 4 Drawing Sheets

MODULAR ENCODER AND METHOD OF MANUFACTURING THE SAME

TECHNICAL FIELD

The present invention relates to a modular encoder for detecting the number of rotations and a rotation angle of a rotating unit such as a motor.

BACKGROUND ART

FIG. 4 is a perspective view showing a modular encoder 1 according to the prior art. The modular encoder 1 comprises a fixed member 2 to be fixed to a rotary shaft of a motor, and a cage 3 attached to a motor body. The fixed member 2 includes a hollow and cylindrical boss 4 fitted in a rotary shaft, and a transparent/shading member, that is, a pulse disk 6 which has a transparent region and a shading region formed thereon and is fixed to the boss 4 with a clamp 5. The cage 3 includes an electric substrate 8 on which an optical sensor is provided, and a locking member 9 on which a light source is provided. The cage 3 is secured, with a screw 10, to the locking member 9 attached to the motor body. The modular encoder 1 according to the prior art is a separate type modular encoder capable of separating the fixed member 2 from the cage 3 having the electric substrate 8 in a detector.

The boss 4 is fitted in the rotary shaft of the motor and the fixed member 2 is fixed to the rotary shaft with a set vis 11 from the side. Light transmitted from the light source is irradiated on the pulse disk 6, an optical sensor receives, as a light signal, the light which has passed through the transparent region of the pulse disk 6 and converts the light signal into an electric signal, and electric parts provided on the electric substrate 8 output the electric signal as a rotational position signal of the motor. The electric substrate 8 and the locking member 9 according to the prior art have circular shapes as shown in FIG. 4, respectively.

In the modular encoder 1 according to the prior art, however, the set vis 11 should be fastened with a screw from the side perpendicularly to the rotary shaft when fixing the fixed member 2 to the rotary shaft. Therefore, the fixed member 2 is fixed only in a certain direction of the rotary shaft. Accordingly, it has been necessary to take measures for preventing small looseness of the set vis from being caused by restriction of assembly and dimensions.

Since the electric substrate 8 and the locking member 9 have circular shapes, it is hard to reduce the size of the modular encoder 1. More specifically, also in the case where only a dimension in a particular direction should be reduced, the size of the whole body has to be reduced.

Furthermore, the pulse disk 6 is uncovered. For this reason, there has been a possibility that fingers might be injured by the pulse disk 6 when performing assembly or adjustment which needs delicate sensation of the tips of the fingers. In particular, in the case where the pulse disk 6 is formed of a thin metal plate, workers should surely take care.

It is an object of the present invention to provide a modular encoder which has a small size, can easily be assembled, has high reliability, has excellent fixing properties, can be manufactured at a low cost, and has excellent environment resistance.

DISCLOSURE OF INVENTION

In order to attain the above-mentioned object, the modular encoder according to the present invention comprises a holding member provided with a light source (light emitting element), a sign plate on which a transparent region and a shading region are formed, an optical sensor (light receiving element) for receiving, as a light signal, light transmitted from a light source through the transparent region of the sign plate and for converting the light signal into an electric signal, and an electric substrate provided with the optical sensor. The light source may not be provided on the holding member but on the electric substrate, and the optical sensor may not be provided on the electric substrate but on the holding member. In other words, it is preferable that the light source and the optical sensor should be fixed to a body of a rotating unit.

The holding member, the sign plate and the electric substrate are incorporated in a horizontal direction with respect to a rotary shaft of the rotating unit (a direction of a shaft line of the rotary shaft), and are fastened by a fastener such as a screw in the horizontal direction (in the direction of the shaft line) with respect to the rotary shaft. Accordingly, the modular encoder can easily be assembled and fixed. At the same time, reliability of fixation can be enhanced.

It is preferable that the sign plate should be secured to a boss and the boss is fixed to an end of the rotary shaft with a screw extending in the direction of the shaft line.

If the modular encoder according to the present invention has an elliptical shape having a minor axis in a direction in which a dimension should be reduced, a size can be reduced in the direction in which the dimension should be decreased. Accordingly, it is preferable that the holding member and the electric substrate should have elliptical shapes. Thus, the modular encoder has the elliptical shape so that a user using a motor has less restriction in a direction in which the motor is fixed. For example, if an outer shape of the motor is adapted in a direction of the minor axis of the encoder, the user can use two faces of the motor corresponding to the outer shape of the motor because an ordinary motor has a square shape. The other two faces are portions in which the modular encoder protrudes from a motor body in a direction of a major axis. An output cord originally gets out of one of the protruding portions which do not substantially obstruct. The other protruding portion does not substantially obstruct because the three faces of the motor are not simultaneously used by the user. It is preferable that one face of the motor body on the protruding side should be used to ensure horizontal properties with respect to the shaft line of the fixation of the encoder.

Furthermore, the modular encoder has the elliptical shape. Therefore, the electric substrate can be enlarged. While two electric substrates have been required in the prior art, one electric substrate is enough for the present invention. Thus, a cost can be cut down and the height of the modular encoder can be reduced.

Moreover, the modular encoder has the elliptical shape. Therefore, a motor fixing bolt can be fastened without obstruction when the modular encoder is attached to a system of another motor. In addition, the cage has an elliptical shape. Therefore, even if the cage is rotated with respect to the locking member in adjustment of a magnetic pole, the cage less protrudes from the fixing portion. Therefore, the whole shape has less deviation.

It is preferable that the holding member should have a slot extending almost perpendicularly to a major axis of the holding member provided on both ends in the direction of the major axis thereof in such a manner that a fixing position can be adjusted with respect to the rotating unit.

The holding member may be provided with a concave portion for housing the sign plate. Preferably, the holding member has a wall portion surrounding an edge portion of the sign plate. Thus, the holding member is provided with the concave portion for housing the sign plate so that the wall portion surrounding the concave portion functions as a protective fence. Therefore, also in the case where the sign plate (transparent/shading member) is formed of a thin metal plate, there is no possibility that hands might be injured by rotation of the thin plate. Since the sign plate is inserted in the horizontal direction with respect to the shaft line of the rotary shaft (in the direction of the shaft line), the hands are not injured by the thin plate.

The locking member may be provided between the holding member and the rotating unit. Preferably, the holding member is rotatably fitted in the locking member in such a manner that the cage including the holding member and the electric substrate can be rotated around the rotary shaft of the rotating unit during the adjustment of the magnetic pole to make a magnetic pole position of the motor and an origin position of the sign plate coincident with each other. Consequently, the sign plate can easily be aligned.

Preferably, the modular encoder according to the present invention is manufactured by a manufacturing method comprising the steps of fixing a locking member to a rotating unit and fastening them in a direction of a rotary shaft, fixing a holding member to the locking member and fastening them in the direction of the rotary shaft, fixing a sign plate to the rotary shaft and fastening them in the direction of the rotary shaft, and fixing an electric substrate to the holding member and fastening them in the direction of the rotary shaft.

The modular encoder having the above-mentioned structure can be assembled by inserting a driver in the direction of the shaft line of the rotary shaft. Therefore, the modular encoder can easily be assembled and fixed to the rotating unit.

The holding member is rotatably fitted in the locking member in such a manner that the holding member can be rotated around the rotary shaft of the rotating unit. Therefore, the holding member is not shifted in a radial direction with respect to the rotary shaft during adjustment of the origin. Therefore, the adjustment can easily be performed.

The electric substrate has an elliptical shape. Therefore, a dimension in a predetermined direction can be reduced, and an area of the electric substrate can be increased. Consequently, while two electric substrates have been required in the prior art, one electric substrate is enough for the present invention. Thus, a size can be reduced and a cost can be cut down.

According to the present invention described above, it is not necessary to attach a set vis in a direction perpendicular to the rotary shaft line unlike the prior art. Furthermore, components such as an encoder (sign plate) and the like can be fixed in the direction of the rotary shaft line of the rotating unit (in the direction of the rotary shaft). Thus, fixing properties can be enhanced and reliability of fastening can also be increased. In addition, the modular encoder has the elliptical shape so that a size thereof can be reduced. Furthermore, since the modular encoder does not have a square shape but the elliptical shape without corners, it has excellent oil retaining properties even if it is sealed with an O ring or the like.

BEST MODE FOR EMBODYING THE INVENTION

Figure 1:
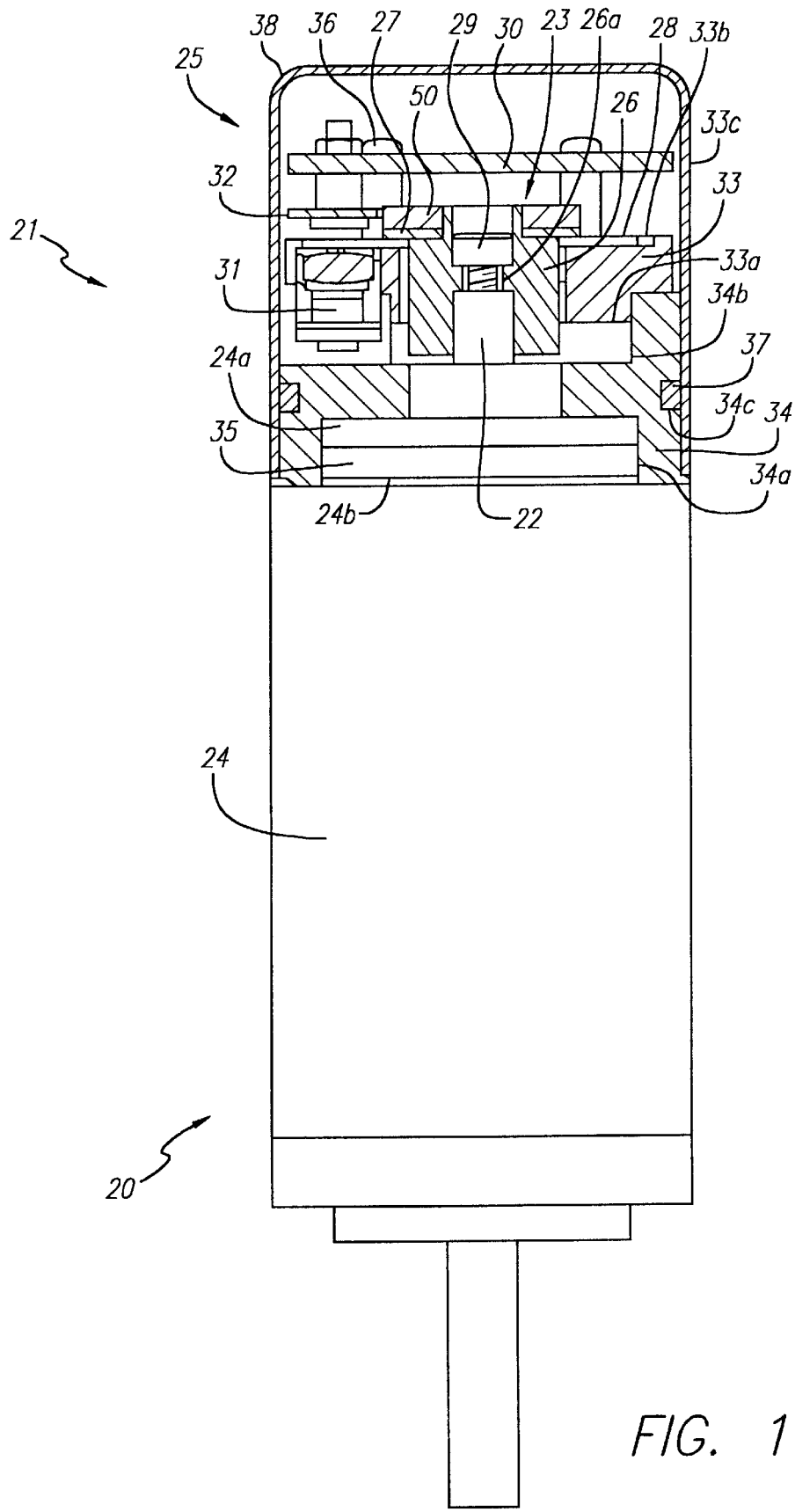
FIG. 1 is a view showing a modular encoder according to the present invention which is fixed to a motor, and is a partially sectional view taken along the line I—I in FIG. 2.
Figure 2:
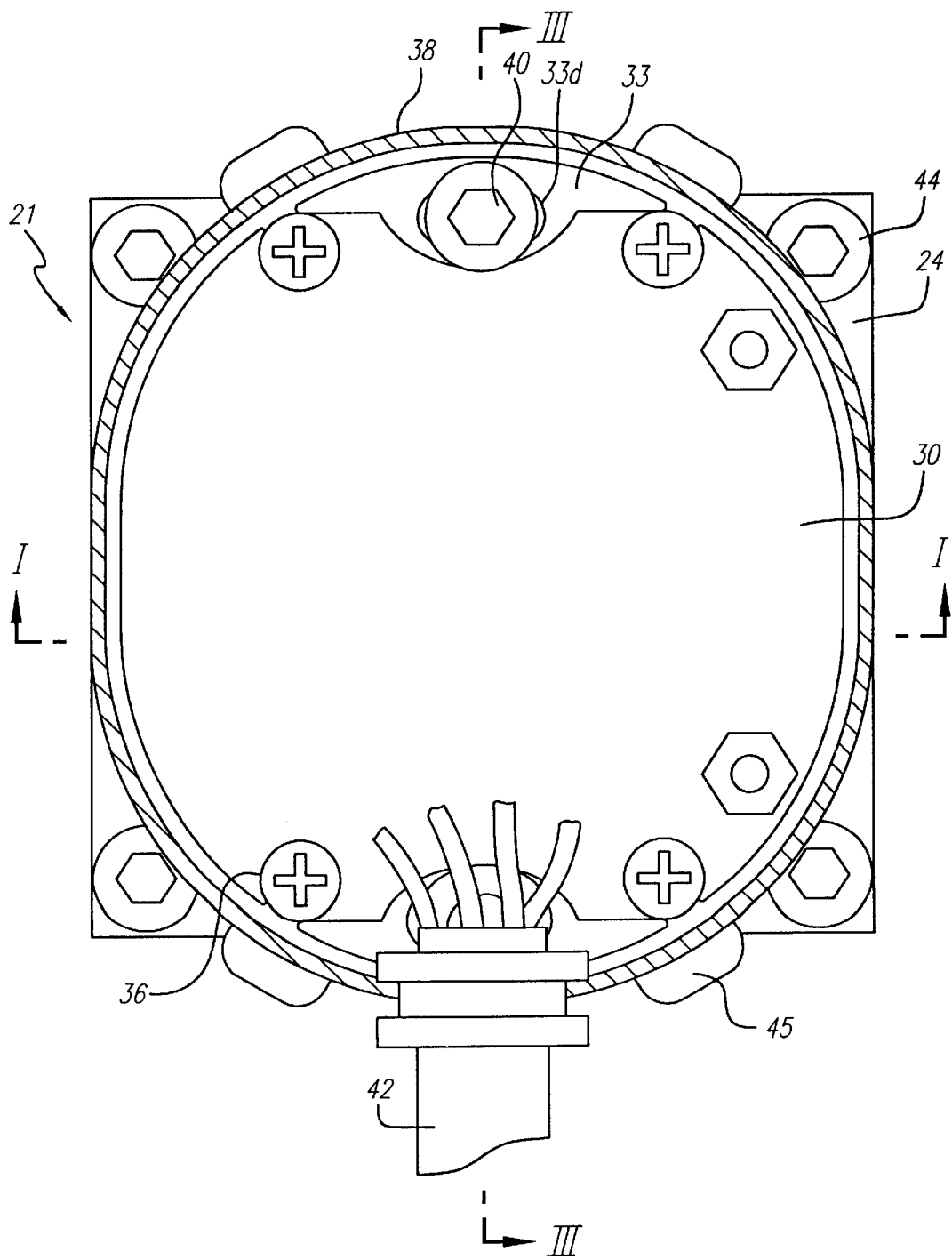
FIG. 2 is a plan view showing the modular encoder according to the present invention.

FIG. 1 is a view showing a modular encoder 21 according to the present invention which is fixed to a rotating unit, that is, a motor 20. In most cases, the motor 20 is mainly a servo motor. FIG. 2 is a plan view showing the modular encoder 21. FIG. 1 is a partially sectional view taken along the line I—I in FIG. 2. The modular encoder 21 comprises a fixed member 23 fixed to a rotary shaft 22 of the motor 20, and a cage 25 locked into a body 24 of the motor 20 through a locking member 34.

The fixed member 23 includes a hollow and cylindrical boss 26 fitted in the rotary shaft 22, and a transparent/shading member, that is, a sign plate (pulse disk) 28 which has a transparent region and a shading region formed thereon and is locked into the boss 26 with a clamp 27. A shoulder 26a protruding inward in a radial direction is formed on a hollow inside of the boss 26. The boss 26 has the shoulder 26a fitted therein so as to abut on an end face of the rotary shaft 22. A female screw is threaded on an end of the rotary shaft 22. A screw 29 is fitted into the female screw to hold the shoulder 26a of the boss 26 between the end face of the rotary shaft 22 and a head portion of the screw 29, thereby fixing the boss 26 to the rotary shaft 22.

The cage 25 includes an electric substrate 30 on which a light receiving element 32 is provided, and a holding member 33 on which a light emitting element is provided. The cage 25 is locked into the body 24 of the motor 20 through the locking member 34. A cylindrical protruding portion 24a which is almost concentric with the rotary shaft 22 is provided on the motor body 24. A ring groove 24b is provided on a circumference of the cylindrical protruding portion 24a, and an O ring 35 is provided on the ring groove 24b. A gatepost-shaped opening 34a is formed on the locking member 34. The opening 34a is fitted in the protruding portion 24a. The O ring 35 seals a portion between the locking member 34 and the protruding portion 24a. An almost cylindrical opening 34b is formed on the side of the locking member 34 opposite to the motor 20. The opening 34b is formed almost concentrically with the opening 34a. The opening 34b is broken in a portion corresponding to a position where the light emitting element 31 is provided. A cylindrical protruding portion 33a is provided on the holding member 33 and is fitted in the opening 34b of the locking member 34. A concave portion 33b for housing the sign plate 28 is formed on the side of the holding member 33 opposite to the motor 20. A wall portion 33c surrounding the concave portion 33b functions as a protective fence for preventing fingers from touching the sign plate 28 made of a thin metal plate and from being injured. The electric substrate 30 is fixed to the holding member 33 with a vis 36.

A permanent magnet 50 is attached to the rotary shaft 22 through a ring holding member. The electric substrate 30 is provided with a magnetic sensor 51 using an MR sensor (an MR magnetoresistance effect device) for detecting a magnetic field of the permanent magnet 50. Based on a signal sent from the magnetic sensor 51, the number of rotations of the rotary shaft 22 and a direction of the rotation thereof can be detected.

The modular encoder 21 is covered with a cover 38. A ring groove 34c is formed on an outer periphery of the locking member 34. An O ring 37 is provided on the ring groove 34c. The O ring 37 seals a portion between the locking member 34 and the cover 38. The cover 38 is locked into the locking member 34 with a screw 45.

Figure 3:
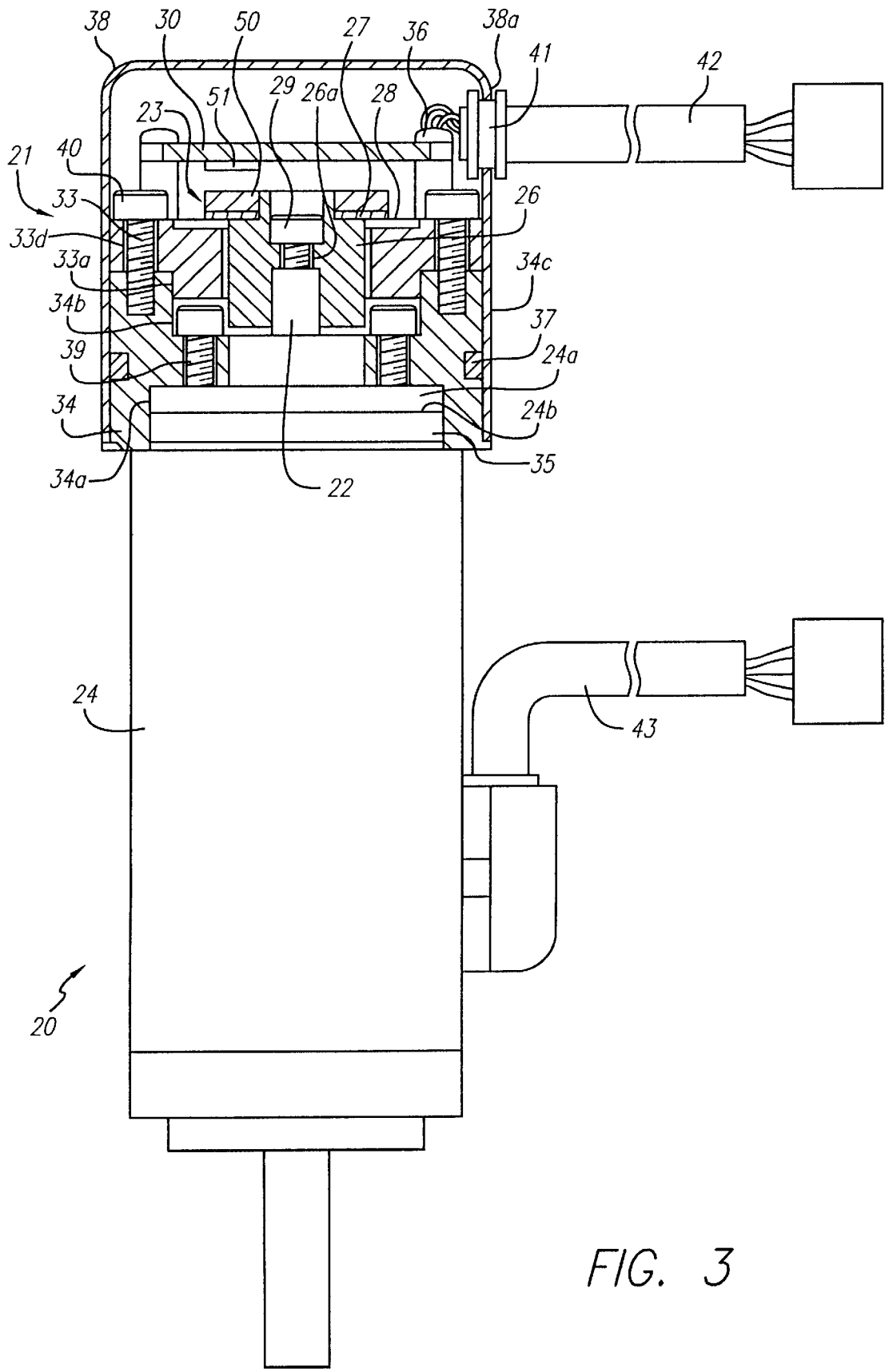
FIG. 3 is a partially sectional view showing the modular encoder according to the present invention which is taken along the line III—III in FIG. 2.
Figure 4:
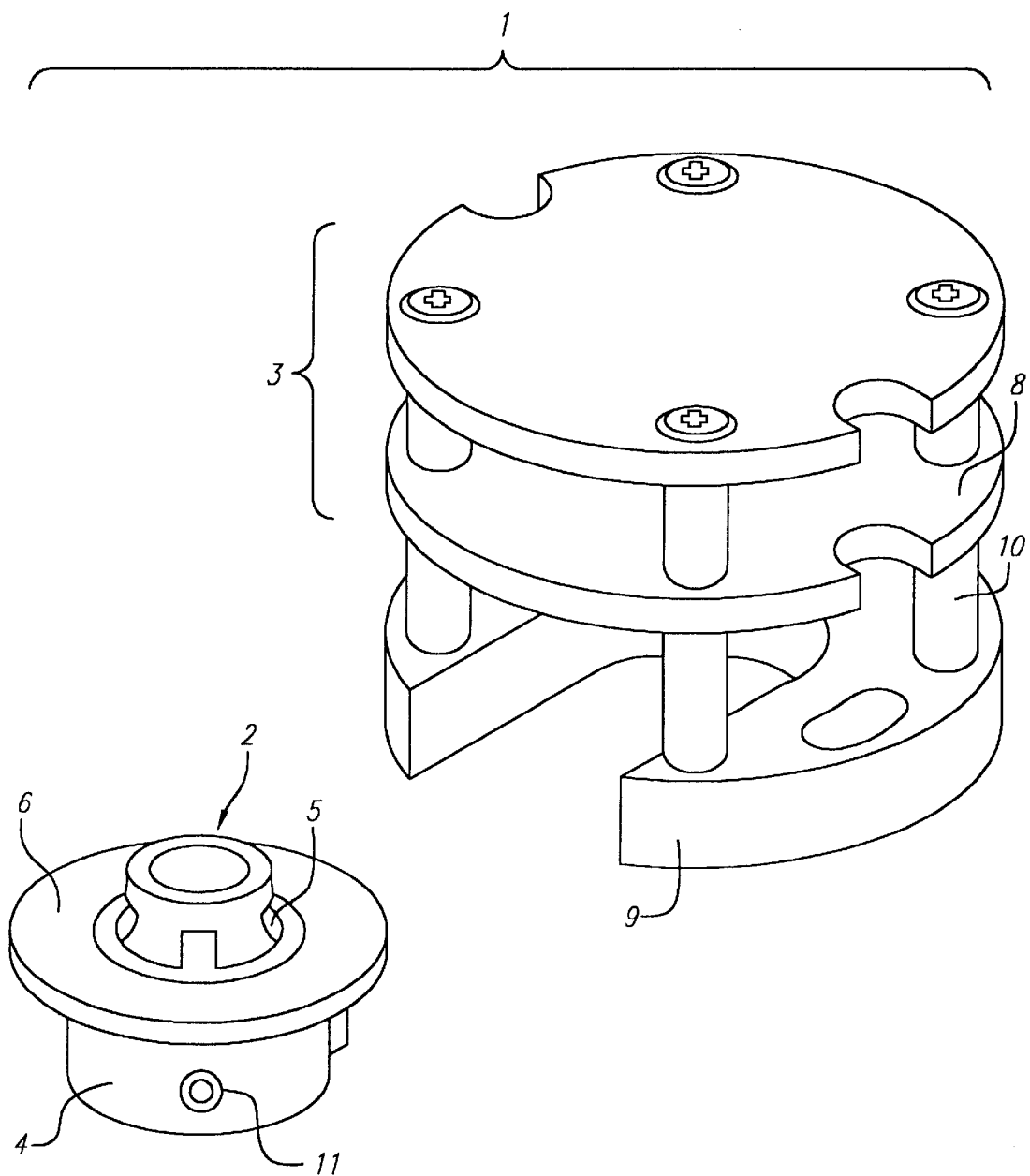
FIG. 4 is a perspective view showing a modular encoder according to the prior art.

As is apparent from FIG. 2, the electric substrate 30, the holding member 33 and the locking member 34 have elliptical shapes. The body 24 of the motor 20 has a square shape. A width of the motor body 24 and a minor axis of the modular encoder 21 are almost equal to each other. On the other hand, a major axis of the modular encoder 21 is greater than the width of the motor body 24. FIG. 3 is a partially sectional view taken in a direction of a major axis (longitudinal shaft line) of an ellipse of the modular encoder 21, that is, along the line III—III in FIG. 2.

The procedure for assembling the modular encoder 21 will be described below with reference to FIG. 3.

The O ring 35 is fixed to the ring groove 24b formed on the cylindrical protruding portion 24a of the body 24 of the motor 20. The opening 34a of the locking member 34 is fitted in the protruding portion 24a and the locking member 34 is secured to the body 24 of the motor 20 with the screw 39. The cylindrical protruding portion 24a is formed almost concentrically with the rotary shaft 22 of the motor 20, and the openings 34a and 34b of the locking member 34 are formed almost concentrically with each other. Therefore, the opening 34b and the rotary shaft 22 are provided almost concentrically. The protruding portion 33a of the holding member 33 provided with the light emitting element 31 is fitted in the opening 34b of the locking member 34 and the holding member 33 is secured to the locking member 34 with the screw 40.

The fixed member 23 including the boss 26 and the sign plate 28 locked into the boss 26 with the clamp 27 is fixed to the rotary shaft 22. The boss 26 is fitted in the rotary shaft 22 so that the shoulder 26a of the boss 26 is caused to abut on the end face of the rotary shaft 22. The screw 29 is inserted into the boss 26, and is threaded into the female screw of the rotary shaft 22 to hold the shoulder 26a of the boss 26 between the end face of the rotary shaft 22 and the head portion of the screw 29, thereby locking the boss 26 into the rotary shaft 22. At this time, adjustment is performed in such a manner that a magnetic pole position of the motor 20 and an origin position of the sign plate 28 are almost coincident with each other.

Then, the electric substrate 30 provided with the light receiving element 32 is secured to the holding member 33 with a vis 36. A hole 38a is formed on the cover 38. A rubber grommet 41 is attached to the hole 38a. An encoder output cable 42 connected to an electric part provided on the electric substrate 30 is connected to an external device through the grommet 41. A power cable 43 is connected to the motor 20.

Next, a magnetic pole is adjusted finely.

A power is supplied to the motor 20 through the power cable 43 to cause the motor 20 to rotate. With rotation of the motor 20, the sign plate 28 is rotated. Light transmitted from the light emitting element 31 is irradiated on the sign plate 28. The light which has passed through the transparent region of the sign plate 28 is received as a light signal by the light receiving element 32. The light receiving element 32 converts the light signal into an electric signal. The electric part provided on the electric substrate 30 outputs the electric signal as a rotational position signal of the motor. The rotational position signal and the magnetic pole position of the motor are monitored to adjust the magnetic pole. If an origin is shifted, the screw 40 is loosened to rotate the cage 25 including the holding member 33 and the electric substrate 30 with respect to the locking member 34. The hole 33d of the holding member 33 through which the screw 40 is inserted has a slot shape in such a manner that the cage 25 can be rotated to some extent. The opening 34b of the locking member 34 is almost concentric with the rotary shaft 22. Therefore, the holding member 33 is rotated around the rotary shaft 22 and is not shifted in the radial direction of the rotary shaft 22 even if it is rotated with respect to the locking member 34. Accordingly, the cage 25 can be rotated around the shaft line of the rotary shaft 22. Consequently, the magnetic pole can easily be adjusted. When the magnetic pole is completely adjusted, the screw 40 is tightened to lock the holding member 33 into the locking member 34.

The O ring 37 is attached to the ring groove 34c formed on the outer periphery of the locking member 34. The modular encoder 21 is covered with the cover 38. The cover 38 is locked into the locking member 34 with the screw 45. The reference numeral 44 in FIG. 2 denotes a motor fixing vis. Since the modular encoder 21 has an elliptical shape, the motor fixing vis 44 can be tightened without obstruction when the motor body 24 is attached to a system.

INDUSTRIAL AVAILABILITY

As described above, the modular encoder according to the present invention is useful for detecting the number of rotations and a rotation angle of a rotating unit such as a motor, and is more particularly suitable for an apparatus to which a set vis cannot be attached in a direction perpendicular to a rotary shaft line.

We claim:

1. A modular encoder comprising a sign plate which has a transparent region and a shading region formed thereon and is fixed to a rotary shaft of a rotating unit, a light source for irradiating light on the sign plate, a holding member for holding the light source, an optical sensor for receiving, as a light signal, the light transmitted from the light source through the sign plate and for converting the light signal into an electric signal, and an electric substrate on which the optical sensor is provided, further comprising:

a boss holding the sign plate, the boss and the electric substrate being assembled in a direction of a shaft line of the rotary shaft and being fastened with a screw extending in the direction of the shaft line, wherein the holding member and the electric substrate have elliptical shapes, a slot is provided in a direction almost perpendicular to a major axis of the holding member having the elliptical shape on both ends in a direction of the major axis, a screw for fixing the holding member to the rotating unit can be inserted through the slot, and the holding member can be rotated through the slot by a predetermined angle with respect to the rotating unit.

2. A modular encoder comprising a sign plate which has a predetermined pattern formed thereon and is fixed to a rotary shaft of a rotating unit, a detector for reading a predetermined pattern of the sign plate and for detecting rotation information of the rotary shaft, and a holding member for holding the detector, and the holding member has a concave portion for housing the sign plate and a wall portion surrounding an edge portion of the sign plate, and the holding member has such a shape that an adjuster's finger cannot touch an edge portion of the sign plate when adjusting a magnetic pole.

3. The modular encoder according to claim 2, wherein the holding member has a fitting portion to be fitted in a locking member in such a manner that it can be rotated around a shaft line of the rotary shaft with respect to the locking member, the locking member has a first fitting portion to be fitted in a fitting portion of the rotating unit, and a second fitting portion to be rotatably fitted in the fitting portion of the holding member, and the second fitting portion and the fitting portion of the holding member are formed in such a manner that the holding member can be rotated around the shaft line of the rotary shaft with respect to the locking member when the first fitting portion of the locking member is fitted in the fitting portion of the rotating unit to secure the locking member to the rotating unit and the fitting portion of the holding member is fitted in the second fitting portion of the locking member.

4. A method for manufacturing a modular encoder comprising a sign plate which has a predetermined pattern formed thereon and is fixed to a rotary shaft of a rotating unit, a detector for reading the predetermined pattern of the sign plate and for detecting rotation information of the rotary shaft, a holding member for holding the detector, and a locking member for locking the holding member to the rotating unit, comprising the steps of:

fixing a first fitting portion of the locking member into a fitting portion provided on a body of the rotating unit, fastening the rotating unit and the locking member in a direction of the rotary shaft of the rotating unit, fixing the fitting portion of the holding member in a second fitting portion of the locking member;

fastening the locking member and the holding member in a direction of the rotary shaft;

fixing the sign plate to the rotary shaft of the rotating unit and housing the same in a concave portion of the holding member;

fastening the sign plate and the rotary shaft in the direction of the rotary shaft;

fixing the electric substrate to the holding member; and fastening the holding member and the electric substrate in the direction of the rotary shaft.

* * * * *